United States Patent [19]

Philby

[11] Patent Number: 4,677,900
[45] Date of Patent: Jul. 7, 1987

[54] PISTONS FOR INTERNAL COMBUSTION ENGINES

[75] Inventor: Jonathan D. Philby, Rugby, England

[73] Assignee: AE PLC, Warwickshire, England

[21] Appl. No.: 759,650

[22] Filed: Jul. 26, 1985

[30] Foreign Application Priority Data

Aug. 4, 1984 [GB] United Kingdom ............... 8419928

[51] Int. Cl.⁴ .............................................. F16J 1/04
[52] U.S. Cl. ........................................ 92/212; 92/227; 92/228; 92/237; 92/248; 123/192 P
[58] Field of Search ............... 92/212, 227, 228, 225, 92/248, 237, 229, 211, 212, 172; 123/193 P

[56] References Cited

U.S. PATENT DOCUMENTS

| 1,693,584 | 11/1928 | Weaver |  |
|---|---|---|---|
| 2,080,286 | 5/1937 | Mahle | 92/228 |
| 3,115,070 | 12/1963 | Tsang | 92/212 |
| 3,327,593 | 6/1967 | Ciaccia | 92/178 |
| 3,505,934 | 4/1970 | DeBiasse | 92/212 X |
| 3,906,923 | 9/1975 | Harker | 92/212 X |
| 4,314,531 | 2/1982 | Bruni | 92/227 X |

FOREIGN PATENT DOCUMENTS

| 0071361 | 2/1983 | European Pat. Off. |
| 1375013 | 9/1964 | France |
| 1384266 | 11/1964 | France |
| 759954 | 10/1956 | United Kingdom |
| 1146835 | 7/1965 | United Kingdom |
| 1561948 | 12/1976 | United Kingdom |
| 2050563 | 1/1981 | United Kingdom |
| 2105439 | 7/1981 | United Kingdom |
| 2104188 | 8/1981 | United Kingdom |
| 2129523 | 10/1983 | United Kingdom |

Primary Examiner—Edward K. Look
Attorney, Agent, or Firm—Leydig, Voit & Mayer

[57] ABSTRACT

A piston carries on its skirt surface a number of separate strips of a plastics material, such as a polyetheretherketone alloy, so that the strips are hydrodynamically lubricated and transmit lateral thrust from the piston to an associated cylinder or liner. The strips are just proud of the skirt surface and may be contained in recesses formed in the skirt surface.

18 Claims, 10 Drawing Figures

PISTONS FOR INTERNAL COMBUSTION ENGINES

BACKGROUND TO THE INVENTION

1. Field of the Invention

The invention relates to pistons for internal combustion engines.

2. Review of the Prior Art

Conventional pistons for internal combustion engines are provided with generally cylindrical skirts which transmit the lateral loads on the piston to an associated cylinder or liner. A lubricant film is provided between the piston skirt and the associated cylinder or liner in order to prevent metal-to-metal contact between these parts (which would lead to seizure of the engine).

However, the presence of this lubricant film between these parts produces a frictional force which increases the engine losses. In cases where maximum engine power output is of considerable importance, such as in racing cars, it is known to mount on the skirt surface, studs or buttons of a plastics material which engage directly with the associated cylinder or liner; there is no oil film between the parts. Since the coefficient of friction of the plastics material on the material of the cylinder or liner is low and the area of contact is low, there is a corresponding reduction in the frictional losses generated, and thus an increase in the power output of the engine.

These studs or buttons have the disadvantage that, since their contact with the associated cylinder or liner is direct and unlubricated, they are subject to wear. This is not a problem in engines for racing cars, where the life of the engine, or the time for which the engine is run, is of limited and short duration. However, such a limited life is not acceptable in engines for private and commercial vehicles, where a substantial piston life is essential.

SUMMARY OF THE INVENTION

According to the invention, there is provided a piston for an internal combustion engine having a central piston axis and comprising a crown, a gudgeon pin bore defining a gudgeon pin bore axis, a skirt having two opposed portions, at least one strip of plastics material carried on at least one of said skirt portions, at least one strip of plastics material carried on the other of said skirt portions, each said at least one strip of plastics material projecting beyond the associated skirt portion, each side at least one strip of plastics material having a surface for the flaw thereover of lubricating fluid during reciprocation of the associated piston.

BRIEF DESCRIPTION OF THE DRAWINGS

The following is a more detailed description of some embodiments of the invention, by way of example, reference being made to the accompanying drawings in which.

DESCRIPTION OF THE PREFERRED EMBODIMENTS

Figure 1:
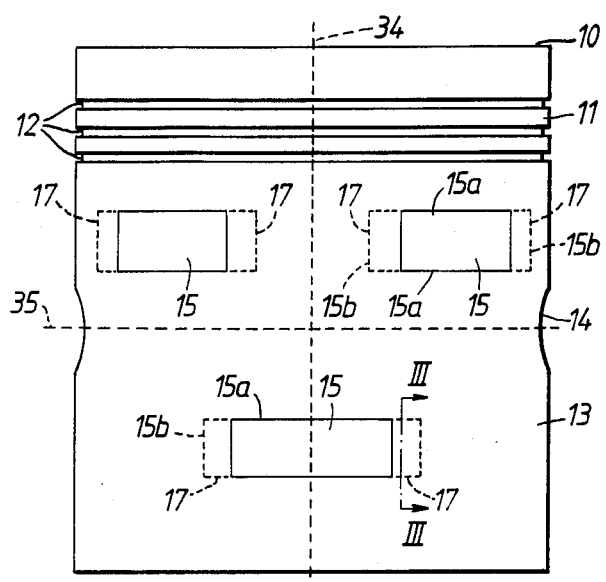
FIG. 1 is a side elevation of a first form of piston carrying three strips of plastics material on each side of the skirt thereof.

Referring first to FIG. 1, the first form of piston for an internal combustion engine comprises a crown 10 surrounded by a ring band 11 provided with three piston ring grooves 12. The skirt 13 depends from the ring band and a gudgeon pin bore 14 extends through the piston. The piston may be forged or cast, particularly squeeze cast, from aluminum or an aluminum alloy such as that known an LO-EX.

On each side of a plane including the piston axis 34 and normal to the gudgeon pin bore axis 35, the skirt 13 carries a plurality of strips 15 of a plastics material. In the embodiment of FIG. 1, three such strips 15 are shown although it will be appreciated that any other suitable arrangement of strips 15 may be used. One suitable material for the strips is a polyetheretherketone alloy of the kind described in British Patent Application No. 84.06547 (Publication No. 2136439). Such an alloy is a mixture of polyetherketone, together with polytetrafluoroethylene (PTFE), graphite and bronze. The polyetherketone may be polyetheretherketone and the bronze may be a tin bronze, for example an 11% tin bronze. Each strip 15 is generally rectangular in shape with longer sides 15a interconnected by shorter sides 15b. The strips 15 have a width and a length which are substantially greater than their thickness so that they are flexible about axes across their width.

Figure 2:
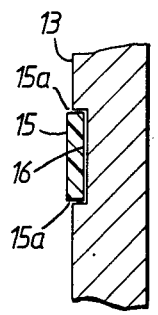
FIG. 2 is a section of a part of the skirt of the piston of FIG. 1, showing one of the three strips carried in a recess in the skirt.

The strips 15 may be placed directly on the surface of the skirt 13 although it is preferred that, as seen in FIG. 2, the strips are inserted in corresponding recesses 16, each recess 16 being shaped to receive the associated strip 15 and having a radial depth which is such that at least a part of the associated strip 15 is radially outwards of the skirt 13 surrounding the recess 16. This outward extent or "height" may be, for example, less than 125 microns and may, for example, be at least 25 microns. The strips 15 are arranged with their longer sides 15a extending circumferentially and with the interconnecting shorter sides extending parallel to the piston axis.

Figure 3A:
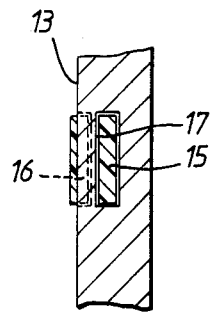
FIGS. 3A and 3B are alternative sections on the line III—III of FIG. 1 showing respective forms of slot provided in the piston skirt for receiving the ends of the strips.

As seen in FIG. 1, the strips 15 are held in position by inserting the ends of each strip into slots 17 formed in the piston skirt 13. These slots 17 may be formed entirely within the thickness of the skirt 13 (see FIG. 3A) or may pass right through the skirt 13 so that the associated strip extends into the interior of the piston (see FIG. 3A).

Figure 4:
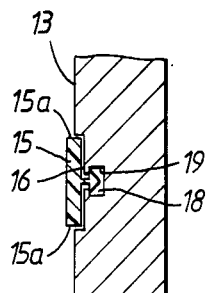
FIG. 4 is a similar view to FIG. 2 but showing the strip connected to the skirt by a snap-fit coupling.

In an alternative construction shown in FIG. 4, each strip 15 and the skirt 13 may be provided with interengaging parts 18, 19 which are snap-fit together to hold the strip onto the skirt. As shown, the strip 15 is provided with a projection 18 having a head which can be snapped into an aperture 19 provided at the back of the associated recess 16 so that the head engages in the aperture.

The three strips 15 are arranged as follows (see FIG. 1). Two of the strips 15 are located towards the ring band 11 and are equidistantly spaced on either side of a plane including the piston axis 34 and normal to the gudgeon pin bore axis 35. The remaining strip 15 is spaced axially downwardly from these two strips and is in register with the gap between the two upper strips 15 so that it is disposed symmetrically about the plane.

Figure 5:
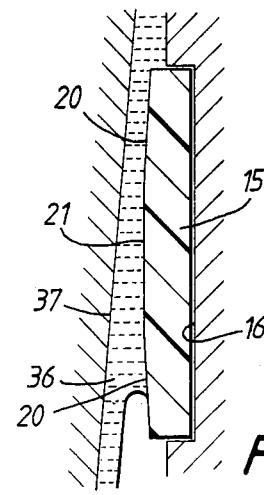
FIG. 5 is a section through a strip of the kind shown in FIGS. 1 to 3 showing bevelled edges to the strip.

The surface of each strip 15 may be such that the surface intersects planes including the piston axis 34 along straight lines, as shown in FIGS. 2 and 4. Alternatively, as shown in FIG. 5, the surface of each strip 15 may be formed with circumferentially extending bevelled portions 20 which extend between a central area 21 of each strip 15 and the longer sides 15a respectively. The angle of these bevels 20 may be no more than 2 degrees. Alternatively, the surface of the strip 15 may be of curved cross-section in planes including the piston axis; with the curvature being such that the maximum tangential angle is no more than 2 degrees.

In use, the piston of FIG. 1 is attached to a connecting rod and reciprocates in an associated cylinder or liner with a film of oil being provided on the surface of the cylinder or liner by an oil supply and an oil control ring carried in the lowermost piston ring groove 12. The outward radial spacing of the strips 15 from the surrounding skirt 13 is greater than the thickness of this oil film and so the lateral thrust forces on the piston, caused by the angle of the connecting rod relative to the piston, are transmitted to the associated cylinder or liner through the three strips 15 alone, and not through the remainder of the skirt 13. Since the frictional forces generated between the piston and the cylinder are proportional to the area of the oil film, this reduction in the area of the oil film, as compared to a conventional piston where the oil film extends over the whole skirt surface, reduces the frictional forces between the piston and the associated cylinder and so increases the performance of the associated engine. Although the reduction in area is substantial, hydrodynamic lubrication is nevertheless maintained and mixed or boundary lubrication avoided.

Since, in general, the piston will tilt relative to the associated cylinder or liner, during reciprocation, the surfaces of the strips 15 will not be parallel to the surface of the associated cylinder or liner during such reciprocation, but will be slightly angled. This will cause the cylinder or liner and the surfaces 15 to form a hydrodynamic wedge between them which will assist in forcing lubricant over the strip surface to maintain efficient hydrodynamic lubrication between these parts.

Where the strips 15 are bevelled or curved (see FIG. 5), this assists in the formation of hydrodynamic wedges 36 of lubricant between the strips 15 and the associated cylinder or liner 37 which provide a pressurized film of oil over the surfaces of the strips 15. The fact that the strips 15 have a greater circumferential dimension than axial dimension ensures that this film is maintained over the whole axial length of the strips 15 because the oil cannot readily escape in a circumferential direction. In addition, the location of the strips 15 on the surface, with the lowermost strip in register with the gap between the two upper strips, ensures that each strip 15 has an uninterrupted flow of oil over its surface.

In general, a reduction in the area of the oil film between the piston and the associated cylinder or liner tends to increase the noise generated by the piston during reciprocation, because the greater the volume of oil between the piston and the associated cylinder or liner, the greater the damping action of this oil film. However, the use of these plastics strips 15 provides a noise-dampening effect which mitigates this disadvantage or may even reduce the amount of noise produced by the piston of FIG. 1 in comparison with a conventional piston with a full skirt. This is assisted by the fact that oil will seep into the recesses 16 behind the strips 15 and form an oil cushion between the back surfaces of the strips and the adjacent skirt surface allowing limited and noise dampening radial movement of the strips 15.

A further problem in pistons is that of direct contact between the piston and the associated cylinder or liner. This can occur on starting, before the oil film 36, FIG. 3 has had a chance to become established, or at top and bottom dead centre where the piston is momentarily stationary. In a conventional piston, these direct contacts can lead to marking of the piston surface and increased frictional forces as a result of the direct metal-to-metal contact. In the piston described above with reference to FIGS. 1 to 5, however, any contact between the piston and the associated cylinder or liner is contact between the cylinder or liner and the plastics strips 15. Due to their low inherent coefficient of friction, this produces little or no increase in the frictional forces and allows the piston to run smoothly over the surface of the cylinder without scoring or wear until the lubricant film is established or until the piston has passed top or bottom dead centre.

Because the strips 15 are held only loosely in their associated recesses, it is possible for them to tilt slightly about an axis parallel with the gudgeon pin bore axis. This 'tilting pad' effect can further assist in ensuring hydrodynamic lubrication over the surfaces of these strips 15, even where the bevels 20 are not provided.

Figure 6:
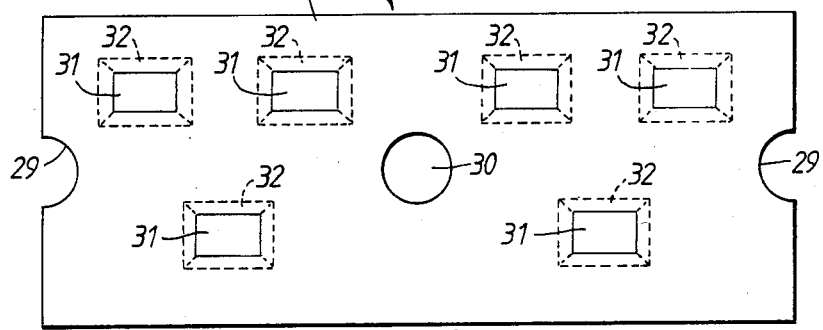
FIG. 6 is an elevation of a backing sheet of a plastics material, carrying six strips and for connection to a piston.

Referring next to FIG. 6, in an alternative embodiment, a one-piece sheet member 27 is formed from any of the plastics materials described above with reference to FIGS. 1 to 5. The one-piece sheet member 27 is to be wrapped around a piston below the ring band and a comprises a backing sheet 28, whose breadth is equal to the diameter of the piston around which it is to be wrapped and whose height is equal to the length of the piston below the ring band. The backing sheet 28 is formed with semi-circular cut-outs 29 at the side edges and a central aperture 30. These cut-outs 29 and the aperture 13 register with, and are of the same radius as, respective ends of the gudgeon pin bore, when the member 27 is wrapped around the piston.

One surface of the sheet 28 is formed with six strips 31, arranged in two groups of three, one group being between one cut-out 29 and the central aperture 30 and the other group being between this aperture and the other cut-out 29. Each group comprises two strips 31 which are arranged towards an upper edge of the backing sheet 28 and which are circumferentially spaced and axially aligned. The remaining strip 31 is, in a circumferential direction, intermediate the two upper strips and is spaced downwardly therefrom. Each strip 31 is rectangular with longer edges extending circumferentiallly and interconnected by shorter edges. Ramps or bevels 32 connect these edges to the surrounding backing sheet 28. The height of the strips 31 above the backing sheet 28 may be between 12 and 125 microns and the ramp angle less than 2 degrees.

In use, the member is fixed around and to the piston by, for example, a suitable adhesive. The backing sheet 28 forms the skirt of the piston and the strips 31 operate as described above with reference to FIGS. 1 to 5. Oil held on the associated cylinder or liner is forced up and over the strips 31 by a hydrodynamic wedge action between the ramps 32 and the associated cylinder or liner. Films of oil held on the skirt surface and the associated cylinder or liner do not contact one another, so contributing nothing to the viscous losses. In addition, if the member 27 is not tightly wrapped around the piston, oil will seep between the member 27 and the piston and this will provide an oil cushion which will damp lateral movement of the piston and so reduce noise.

The member 27 may be produced by any suitable plastics forming process, for example, an injection moulding process.

Figure 7:
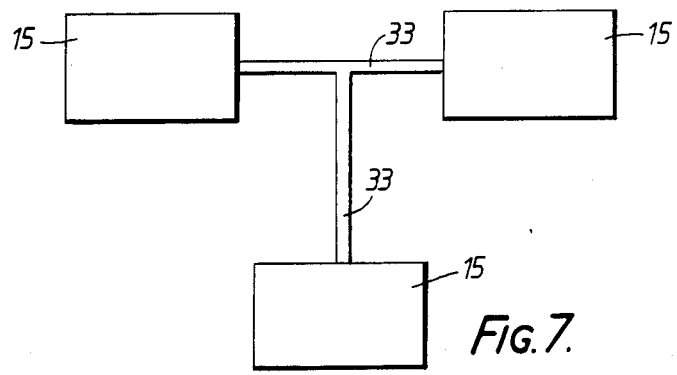
FIG. 7 is an elevation of three strips of plastics material interconnected to form a one-piece member for connection to a piston.

Referring next to FIG. 7, this Figure shows an alternative configuration of the embodiments of FIGS. 1 to 5 in which the strips 15 to one side of the plane including the piston axis and the gudgeon pin bore axis, are interconnected by connecting pieces 33. Thus, the strips 15 and the connecting pieces 33 form a one-piece member which can be produced in a single plastics forming process, such as injection moulding.

The one-piece member of FIG. 7 may be connected to the piston in any of the ways described above with reference to FIGS. 1 to 3. The connecting pieces 33 are laid in appropriately sized grooves cut in the surface of the piston.

Figure 8:
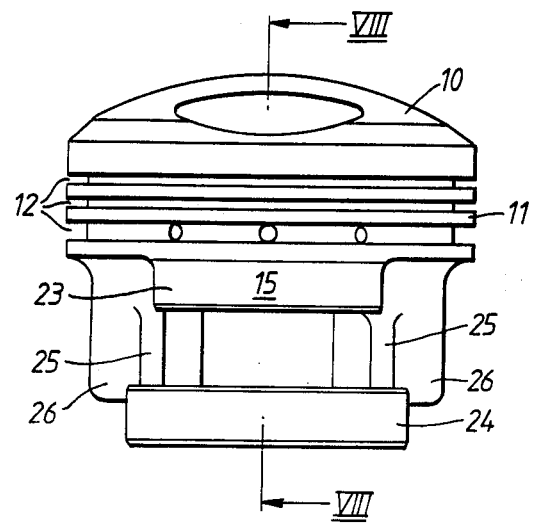
FIG. 8 is a side elevation of a second form of piston having separate skirt portions covered with strips of plastic material.
Figure 9:
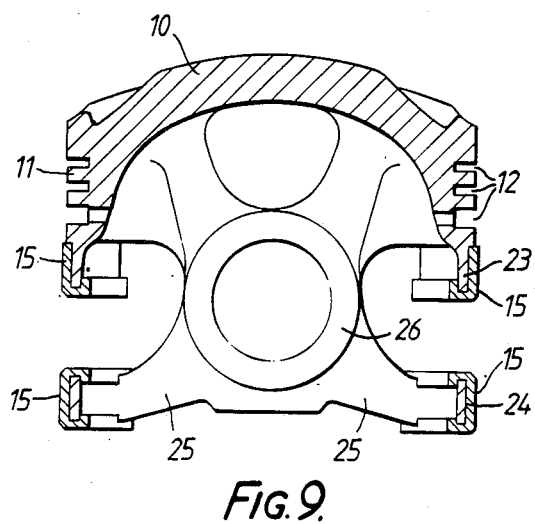
FIG. 9 is a section on the line VIII—VIII of FIG. 8.

Referring next to FIGS. 8 and 9, the second form of piston has two separate skirt surfaces 23, 24 on either side of a plane including the piston axis and the gudgeon pin bore axis. Parts common to FIG. 1 and to FIG. 8 and 9 are given the same reference numerals and will not be described in detail. One of these two skirt surfaces 24 is towards the lower end of the piston and is mounted on a pair of struts 25 extending outwardly from the gudgeon pin bosses 26. The other 23 of these two surfaces depends from the lower edge of the ring band 11. Each surface 23, 24 is rectangular in shape and is disposed symmetrically about a plane including the piston axis and normal to the gudgeon pin bore axis.

Each surface 23, 24 is covered with a strip 15 of plastics material of any of the kinds referred to above. On the lower surfaces, the strips are provided with upper and lower grooves (see FIG. 9) which snap over the upper and lower edges of these skirt surfaces 24. Similar grooves are provided at the lateral ends of the strips and similarly snap over the ends of the skirt surface.

On the upper of the skirt surfaces 23, the strip snaps over the lower edges of the surfaces and is contained in a recess formed in this surface. Grooves at the lateral edges of the strips snap over the lateral edges of these skirt portions.

The strips 15 may be provided with bevelled or curved surfaces in the manner described above with reference to FIG. 5.

Figure 3B:
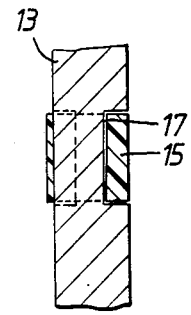

In use, the piston of FIGS. 8 and 9 reciprocates in a piston in a similar way to the piston of FIGS. 1 and 3. A lubricant film is forced up and over the strips 15 to provide efficient hydrodynamic lubrication.

It will be appreciated that the strips may be formed on the piston other than as described above. For example, the piston skirt may be provided with recessed portions in which the strips are formed by direct injection moulding. The recesses may be provided with an aperture in which is formed part of the strips which lock the strips to the associated recesses. Where the strips are to be profiled, this is achieved by suitable shaping of the injection mounding device so that the profile is formed with the strips.

I claim:

1. A piston for reciprocation in a lubricated cylinder of an internal combustion engine having a central piston axis and comprising:
   a crown,
   a gudgeon pin bore defining a gudgeon pin bore axis,
   a skirt having two opposed portions,
   at least one strip of plastics material carried on at least one of said skirt portions,
   at least one strip of plastics material carried on the other of said skirt portions,
   each said at least one strip of plastics material projecting beyond the associated skirt portion to prevent the formation of a film of lubricant between the skirt and said cylinder,
   each said at least one strip of plastics material being rectangular and having a width and length substantially greater than the thickness thereof to allow each said one strip of plastics material to tilt relative to the associated skirt portion, to permit the formation between each strip and an associated lubricated cylinder of a hydrodynamic film of lubricant on reciprocation of the piston in said associated cylinder.

2. A piston according to claim 1, wherein the at least one each strip has ends which are inserted in respective slots provided in the piston skirt to connect the strip to the skirt.

3. A piston according to claim 2, wherein the slots pass through the skirt to the interior of the piston.

4. A piston according to claim 1, wherein the slots terminate within the thickness of the skirt.

5. A piston according to claim 1, wherein the at least one strip and the skirt are provided with inter-engaging parts which are a snap-fit together to hold the at least one strip on the skirt.

6. A piston according to claim 5, wherein the skirt is provided with a recess for the at least one strip, said recess being shaped to receive the associated strip and having a radial depth which is such that at least a part of the associated strip is radially outward of the skirt surrounding the recess.

7. A piston according to claim 1, wherein, on each side of a plane including the piston axis and the gudgeon pin bore axis, there are at leat two said strips, said strips being interconnected to form a one-piece member which is fixed to the piston.

8. A piston according to claim 1, wherein, on each side of a plane including the piston axis and the gudgeon pin bore axis, there is at least one strip, the strips being formed in one-piece with a backing sheet which is wrapped around and fixed to the piston to form a skirt carrying said strips.

9. A piston according to claim 1, wherein the at least one strip extends beyond the surrounding skirt by a maximum distance of less than 125 microns.

10. A piston according to claim 9, wherein said extent of the at least one strip beyond the surrounding skirt is at least 25 microns.

11. A piston according to claim 1, wherein on each side of a plane including the piston axis and the gudgeon pin bore axis, at least three strips are provided, two of the strips being circumferentially aligned and spaced on either side of a plane including the piston axis and normal to the gudgeon pin bore axis, the at least one other strip being axially spaced therefrom.

12. A piston according to claim 11, wherein three strips are provided on each side of said plane, the third strip being arranged in register with the gap between the two first-mentioned strips.

13. A piston according to claim 1, wherein said at lest one strip has longer sides thereof extending circumferentially and interconnecting shorter sides extending in an axial direction.

14. A piston according to claim 13, wherein the at least one strip has upper and lower circumferentially extending bevels leading from a central portion of the associated strip to respective longer sides of the associated strip.

15. A piston according to claim 14, wherein the angle of each bevel is no more than 2 degrees so that the bevels form, with the associated cylinder or liner, a converging hydrodynamic wedge which forces oil over the surface of the associated strip.

16. A piston according to claim 1, wherein the at least one strip is formed of a mixture polyetherketone together with polytetrafluoroethylene (PTFE), graphite and bronze.

17. A piston according to claim 16, wherein the polyetherketone is polyetheretherketone and the bronze is a tin bronze.

18. A piston according to claim 1, wherein the at least strip has a rear surface which is spaced from an adjacent part of the skirt for the receipt of a lubricant therebetween to damp lateral movements of the piston.

* * * * *